(12) United States Patent
Adams et al.

(10) Patent No.: US 7,801,759 B1
(45) Date of Patent: *Sep. 21, 2010

(54) CONCEPT SELECTION TOOL AND PROCESS

(75) Inventors: Mark Adams, Overland Park, KS (US); Larry Eugene Baker, Jr., Arlington, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 682 days.

This patent is subject to a terminal disclaimer.

(21) Appl. No.: 10/857,759

(22) Filed: May 28, 2004

(51) Int. Cl.
*G06F 17/30* (2006.01)

(52) U.S. Cl. .......................... 705/10; 705/1.1

(58) Field of Classification Search ................ 707/3
See application file for complete search history.

(56) References Cited

U.S. PATENT DOCUMENTS

| | | | | |
|---|---|---|---|---|
| 6,039,688 | A * | 3/2000 | Douglas et al. | 600/300 |
| 6,047,288 | A | 4/2000 | Kurosawa et al. | |
| 6,115,691 | A | 9/2000 | Ulwick | |
| 6,324,647 | B1 | 11/2001 | Bowman-Amuah | |
| 6,466,928 | B1 | 10/2002 | Blasko et al. | 706/46 |
| 6,662,357 | B1 | 12/2003 | Bowman-Amuah | |
| 6,694,329 | B2 * | 2/2004 | Murray | 707/103 Y |
| 6,833,842 | B2 | 12/2004 | Keeley | |
| 7,051,036 | B2 | 5/2006 | Rosnow et al. | |
| 7,421,660 | B2 | 9/2008 | Charnock et al. | |
| 7,430,498 | B2 | 9/2008 | Butterfield et al. | |
| 7,509,274 | B2 * | 3/2009 | Kam et al. | 705/35 |
| 7,526,434 | B2 * | 4/2009 | Sharp | 705/10 |
| 7,559,049 | B1 | 7/2009 | Hemmat et al. | |
| 2001/0027455 | A1 | 10/2001 | Abulleil et al. | |
| 2002/0023033 | A1 * | 2/2002 | Campbell et al. | 705/36 |
| 2002/0026630 | A1 | 2/2002 | Schmidt et al. | |
| 2002/0038321 | A1 | 3/2002 | Kelley | 715/514 |
| 2002/0042731 | A1 | 4/2002 | King, Jr. et al. | |
| 2002/0059512 | A1 | 5/2002 | Desjardins et al. | |
| 2002/0087757 | A1 * | 7/2002 | Wagner | 710/54 |
| 2002/0107722 | A1 | 8/2002 | Laurin et al. | 705/10 |
| 2002/0169658 | A1 | 11/2002 | Adler | 705/10 |
| 2003/0033191 | A1 | 2/2003 | Davies et al. | |
| 2003/0149610 | A1 | 8/2003 | Rowan et al. | 705/10 |

(Continued)

OTHER PUBLICATIONS

"An Integrated framework for project portfolio selection", NP Archer et al., pp. 207-216, 1999.*

(Continued)

*Primary Examiner*—Neveen Abel Jalil
*Assistant Examiner*—Kellye D Buckingham (57) ABSTRACT

A system for selecting a concept related to an enterprise development project is provided. The system includes a database, an authoring component, a review component, a scoring component, and an evaluation component. The database stores information about a concept and the authoring component allows a user to provide the information about the concept. The review component allows a reviewer to review the concept. The scoring component is operable for individuals to score the concept. The concept may also be designated with a priority. The evaluation component is operable for one or more evaluators to consider and designate the concept for further consideration. The concept is identified as associated with the strategic enterprise initiative that the concept supports. The system also includes graphical user interfaces that allow the concepts to be evaluated and viewed based on both the priority and score of the concepts.

25 Claims, 8 Drawing Sheets

U.S. PATENT DOCUMENTS

| | | | |
|---|---|---|---|
| 2004/0010513 A1 | 1/2004 | Scherr et al. | 707/104.1 |
| 2004/0059628 A1 | 3/2004 | Parker et al. | 705/12 |
| 2004/0068429 A1* | 4/2004 | MacDonald | 705/10 |
| 2004/0073442 A1* | 4/2004 | Heyns et al. | 705/1 |
| 2004/0073477 A1* | 4/2004 | Heyns et al. | 705/10 |
| 2004/0143811 A1 | 7/2004 | Kaelicke et al. | |
| 2004/0162751 A1 | 8/2004 | Tsyganskiy et al. | 705/10 |
| 2004/0230468 A1* | 11/2004 | King et al. | 705/10 |
| 2004/0237030 A1 | 11/2004 | Malkin | 715/505 |
| 2005/0114829 A1 | 5/2005 | Robin et al. | |
| 2005/0198047 A1* | 9/2005 | Garcia et al. | 707/100 |
| 2005/0204283 A1* | 9/2005 | Kroeger | 715/530 |
| 2006/0184414 A1 | 8/2006 | Pappas et al. | |

OTHER PUBLICATIONS

"Toward a Corporate Performance Measure System", Breat List et al., copyright 2004, p. 1344-1350.*

"The Project Office : Teams, Processes and Tools", M Light et al., 2000, http://www.inforede.net/Technical/Business/IT/PM%20Project%20Office.pdf.*

"An Integrated Framework for project porfolio projects Selection:", N. P. Archer et al., 1999, pp. 207-216, http://www.sciencedirect.com/science?_ob=ArticleURL&_udi=B6V9V-3VS1XKX-1&_user=2502287&_coverDate=08%2F31%2F1999&_rdoc=1&_fmt=high&_orig=search&_sort=d&_docanchor=&view=c&_searchStrId=1325094543&_rerunOrigin=google&_acct=C0000551-09&_version=1&.*

"Development of a web-based system for engineering change management", G Q, Huang , et al., 1999, 255-267; http://www.sciencedirect.com/science?_ob=ArticleURL&_udi=B6V4P-42-SXFSR-7&_user=2502287&_coverDate=06%2F30%2F2001&_rdoc=1&_fmt=high&_orig=search&_sort=d&_docanchor=&view=c&_searchStrId=1325108527&_rerunOrigin=google&_acct=C000055109&_version=1&.*

Adams, Mark, *Collaborative Ideation Tool*, Filing Date—May 28, 2004, U.S. Appl. No. 10/857,758, Specification (39 pgs.), Drawings (7 sheets).

Hemmat, Merzad, *Defining and Sizing Feasible Approaches to Business Needs Within an Integrated Development Process*, Filing Date—May 5, 2003, U.S. Appl. No. 10/429,615, Specification (33 pgs.) and Drawings (3 sheets).

www.imadinatik.com *Imaginatik—Leaders in Innovation Management*, Nov. 23, 2004, 45 Pages.

www.balancedscorecard.org *What is the Balanced Scorecard?*, Nov. 23, 2004, 3 Pages.

www.ideax.info, *Ideax Webview Toolkit*, Nov. 23, 2004, 2 Pages.

Office Action dated Mar. 9, 2007, U.S. Appl. No. 10/950,002, 30 pages.

Final Office Action dated Jul. 11, 2007, U.S. Appl. No. 10/950,002, 38 pages.

Advisory Action dated Sep. 17, 2007, U.S. Appl. No. 10/950,002, 3 pages.

Hemmat, Merzad, "Defining and Sizing Feasible Approaches to Business Needs within an Integrated Development Process", U.S. Appl. No. 10/429,615, filed May 5, 2003.

Adams, Mark, "Collaborative Ideation Tool", U.S. Appl. No. 10/857,758, filed May 28, 2004.

Baker, Larry E., "System and Method for Scoring Development Concepts", U.S. Appl. No. 10/950,002, filed Sep. 24, 2004.

Office Action dated Feb. 20, 2009, U.S. Appl. No. 10/857,758, 39 pages.

Final Office Action dated May 12, 2008, U.S. Appl. No. 10/950,002, 35 pages.

Notice of Allowance dated Feb. 6, 2009, U.S. Appl. No. 10/950,002, 13 pages.

Office Action dated Jul. 30, 2008, U.S. Appl. No. 10/950,002, 33 pages.

Hemmat, Merzad, Patent Application entitled, "Method for Discovering Functional and System and Requirements in an Integrated Development Process," filed Aug. 18, 2003, U.S. Appl. No. 10/643,334.

Final Office Action dated Feb. 18, 2010, U.S. Appl. No. 10/857,758, 17 pages.

* cited by examiner

CONCEPT SELECTION TOOL AND PROCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer software, and more particularly, but not by way of limitation, to a system and method for selecting concepts for enterprise development.

BACKGROUND OF THE INVENTION

Without continuous improvement, an enterprise tends to atrophy. Product revenue tends to decline; process inefficiencies tend to accumulate; and competitiveness tends to become impaired. To remain healthy and competitive, an enterprise must actively reinvent itself. Typically, opportunities to better the enterprise arise from many sources. Enterprise research and development (R&D) activities explore capabilities significantly different from those currently possessed by the enterprise. Competitive research and analysis suggest changes needed to meet or exceed the capabilities possessed by other industry players. Market research explores the changing needs of customers and exposes new forces and patterns of behavior and desire that drive change. Business development identifies new partnerships or relationships that could add value to the enterprise. Operations uncovers inefficiencies and gaps that if corrected would make the enterprise stronger. Strategic business planners and executives set overall direction for the enterprise. This universe of potential change represents alternate futures of the enterprise. Considerable money and time may need to be invested in making a change before it begins to return value. Enterprises typically have limited budgets for investing in change. It is vital to select the correct projects to fund because funding the wrong changes may leave the enterprise in a weakened marketplace position. Also, poor selection reduces cash flow, depletes the funds available for change, and ultimately means that there is less to invest in other change projects.

Enterprises need to look well into the future, to anticipate the economic environment in which they will be operating, and to develop a plan for achieving success in that future economic environment. This activity may be called strategizing, and the product of this activity is a strategy or a strategic initiative. This activity is typically performed by high level executives and by specialized staff dedicated to strategic planning, well removed from the day-to-day operational details of the enterprise. For these strategies to benefit the enterprise they must be translated to operational activities.

SUMMARY OF THE INVENTION

The present disclosure provides a system for selecting a concept. The system includes a database, an authoring component, a review component, a scoring component, and an evaluation component. The database is operable to store information about a concept. The authoring component is operable for a user to provide the information about the concept. The authoring component is in communication with the database. The review component allows at least one reviewer individual to review at least some of the information about the concept. The scoring component is operable for at least one scoring individual to score the concept. The score of the concept by the individual is maintained by the database. The evaluation component is operable for one or more evaluators to consider and designate the concept for further consideration.

The present disclosure, according to another embodiment, provides a system for selection of concepts for enterprise development. The system includes an enterprise development process including strategic enterprise initiatives. The system includes a definition component, a review component, and a selection component. The definition component is operable to define a development project. The definition component is operable to associate the development project with at least one of the strategic enterprise initiatives. The review component is operable to revise the development project. The review component is further operable for assigning a quality level to the development project and comparing a plurality of development projects by the quality level of each of the plurality of projects. The selection component is operable to defer one or more of the development projects and further operable to select one or more of the development project for funding.

In one embodiment, the present disclosure provides a method for concept selection comprising generating a list of projects using an input including an input graphical user interface. The method includes maintaining the projects in a database, prioritizing the projects according to a priority, and displaying the projects in a priority graphical user interface according to the priority. The method includes scoring the projects according to a quality of the projects, and displaying the projects in a quality graphical user interface according to the quality. The method also includes providing a mapping component operable to organize the projects according to one or more strategic initiatives associated with each of the projects.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The careers and compensation of employees in an enterprise are often affected by whether specific projects are authorized, funded and implemented. Consequently, the project funding process may be highly politicized as employees compete to obtain approval for their projects. A politicized funding process does not tend to select the projects best suited to optimizing the enterprise as a whole.

Strategies which are painstakingly crafted by high level executives of enterprises may be difficult to bring to bear on the day-to-day operations of the enterprise. Strategies by their nature are often abstract and directional. Sometimes mere lip service is paid to implementing the strategies in projects. It is not enough to assent to and praise the enterprise strategies; to become real, these must be incorporated in the project funding decision making process and embodied in projects. The high level executives who craft enterprise strategies may find it difficult to quickly identify what projects support which strategies or to quickly identify the effect on project prioritization of changing the enterprise strategies.

What is needed is a project concept selection tool which integrates an objective element and which links the project concept selection process with the enterprise strategic initiatives.

Figure 1:
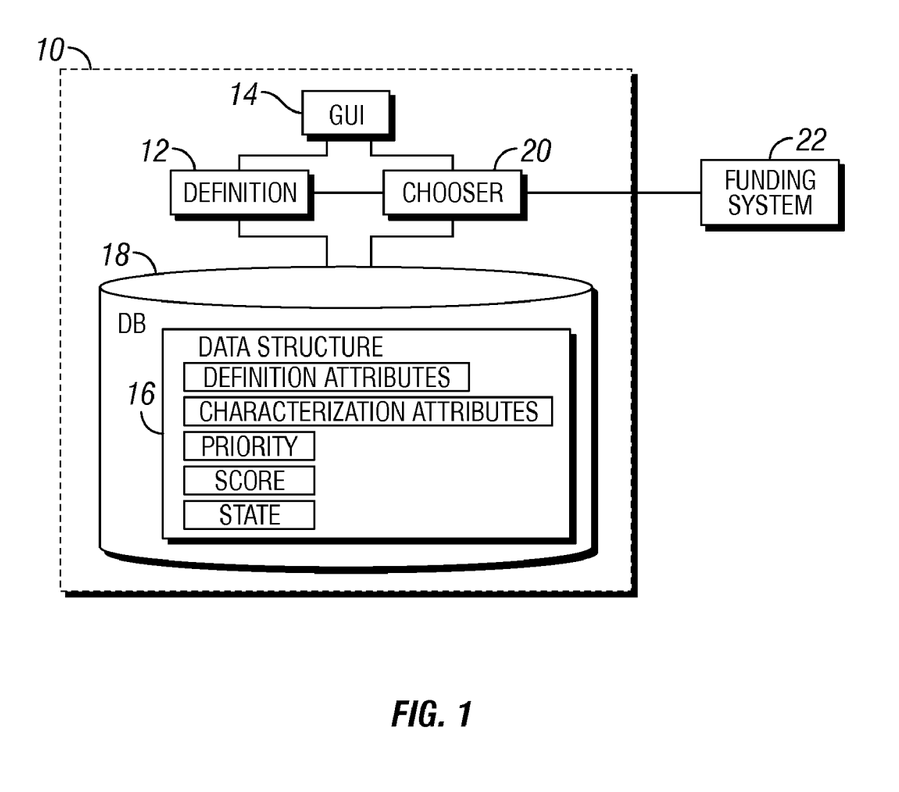
FIG. 1 is a block diagram illustrating one embodiment of a concept selection tool.

Turning now to FIG. 1, a concept selection tool system 10 is depicted. A definition component 12 is in communication with a graphical user interface (GUI) 14. The GUI 14 provides control inputs and displays information. The definition component 12 is in communication with a database 18 and writes concept definition information provided by the GUI 14 to the database 18. This concept definition information may include a data structure 16 containing attribute definitions, attribute characterization, priority, score, and state. The database 18 may contain several data structures 18 each of which represents a project concept.

A chooser component 20 is in communication with the GUI 14, the definition component 12, the database 18, and a funding system 22. The chooser component 20 evaluates concepts and selects the concept for funding.

Figure 2:
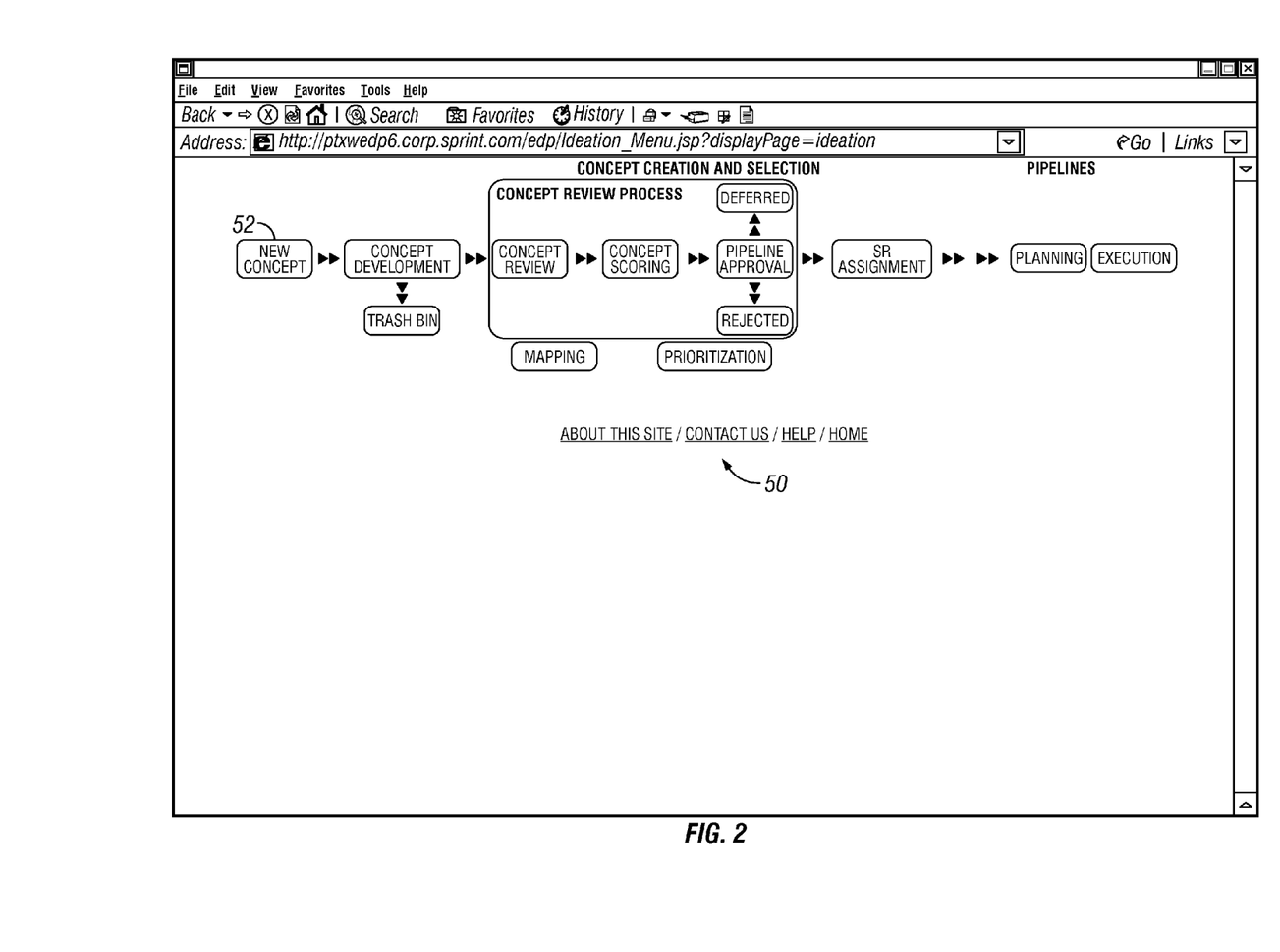
FIG. 2 illustrates a concept creation and selection tool graphical user interface screen.

Turning now to FIG. 2, a concept creation and selection tool screen 50 is shown. The concept creation and selection tool screen 50 is the top level GUI which is first displayed when the concept selection tool system 10 is brought into service and the GUI 14 is activated. Selecting a New Concept button 52 causes a New Concept screen 54 to display. Note that the buttons and text of the concept creation and selection tool screen 50 remain in position through the various GUI screens that support the GUI 14. These buttons and text provide a map of the concept evaluation process, in addition to being functional GUI buttons.

Figure 3:
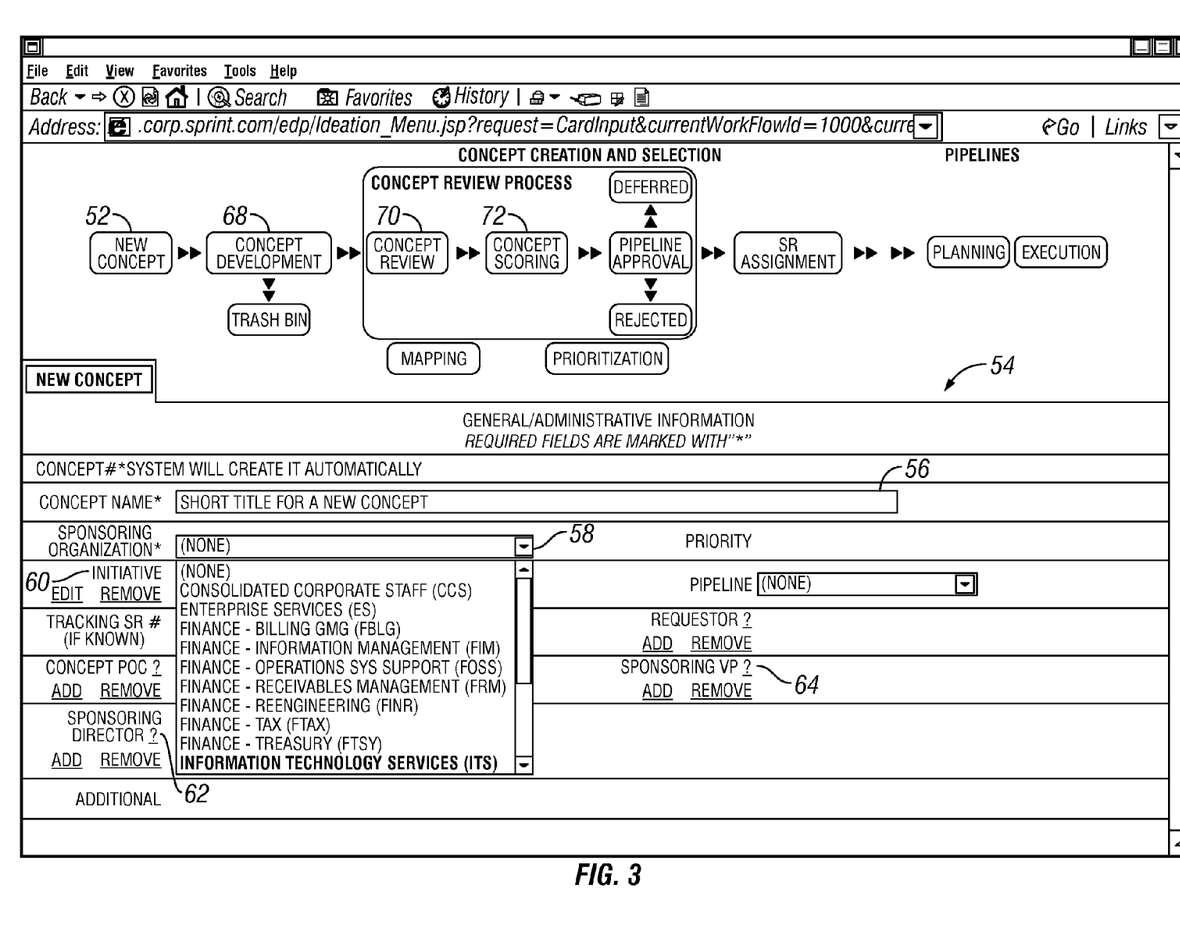
FIG. 3 illustrates a New Concept graphical user interface screen.

Turning now to FIG. 3, the New Concept screen 54 is shown. The New Concept screen 54 is used for the initial definition of the project idea or project concept and for refinement of the project concept. This process may be referred to as concept authoring. During the authoring phase, various information pertaining to the concept may be provided using the New Concept screen 54 including a concept name 56, a window to provide a description of the concept (not shown), a name of a sponsoring organization 58 within the enterprise which is thought to be an appropriate source of funds to develop the concept, a strategic initiative name 60 identifying a strategy with which the concept is aligned, and a name of a director 62 and or a name of a vice president 64 whose group is expected to fund the concept, as well as other information useful for concept selection.

When a save control button (not shown) on the New Concept screen 54 is selected, the concept definition information is communicated from the GUI 14 to the definition component 12. The definition component 12 is in communication with a database 18 and writes the definition information to a data structure 16 contained in the database 18. The authoring process may progress incrementally through several sessions of editing using the New Concept screen 54. After initial concept definition and saving, the concept can be developed further by clicking on the Concept Development button 68.

Figure 4:
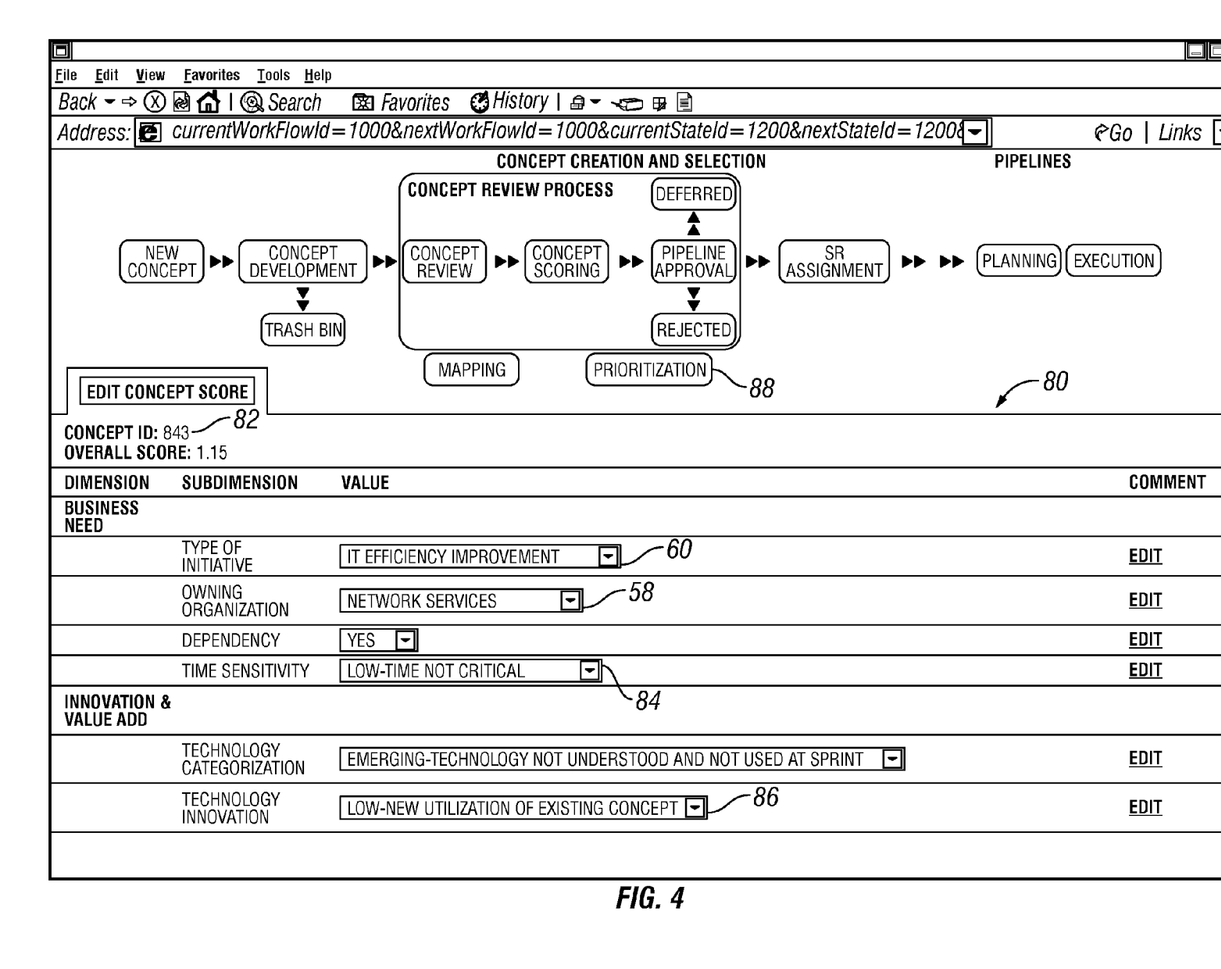
FIG. 4 illustrates a Edit Concept Score graphical user interface screen.

When the authoring phase is complete, for example when the concept definition is complete and the concept is ready to progress to the evaluation phase, a concept review button 70 may be selected to set the concept to the evaluation state. Selecting the concept scoring button 72 causes an Edit Concept Score screen 80 to display.

Turning now to FIG. 4, the Edit Concept Score screen 80 is depicted. The Edit Concept Score screen 80 provides menu selections to characterize attributes of the concept so that the concept may be scored. The Edit Concept Score screen 80 includes inputs for the strategic initiative name 60 to which the concept is aligned, the name of a sponsoring organization 58 to fund the concept development, a time sensitivity level 84, and an innovation level 86. When all of this information is provided and a scoring button (not shown) in the Edit Concept Score screen 80 is selected, the characterization information is sent to the chooser component 20. The chooser component 20 calculates a figure of merit or score based on the characterization information and saves the characterization information and the figure of merit in the data structure 16 in the database 18. This figure of merit is intended to represent the general quality of a concept. This figure of merit is not a metric. It does not measure the performance or operational efficiency of a project concept, as the project has not been executed and put into operation. Using the same calculation or algorithm to measure concepts that are evaluated in the same time-frame provides an objective element to the evaluation process. The figure of merit may be useful in breaking ties between otherwise equally important project concepts. It is not intended to be the primary support of the decision making process.

The calculation algorithm may change over time, as for example when enterprise strategic initiatives shift. For example, a costly concept may be scored higher when the enterprise has adequate funds, but scored lower when funding levels are low and the enterprise places more emphasis on concepts that cost less to implement. The algorithm is captured in the database 18, and when the algorithm is changed, database 18 triggers automatically recalculate the figure of merit or score stored in all data structures 16 contained within the database 18.

Figure 5:
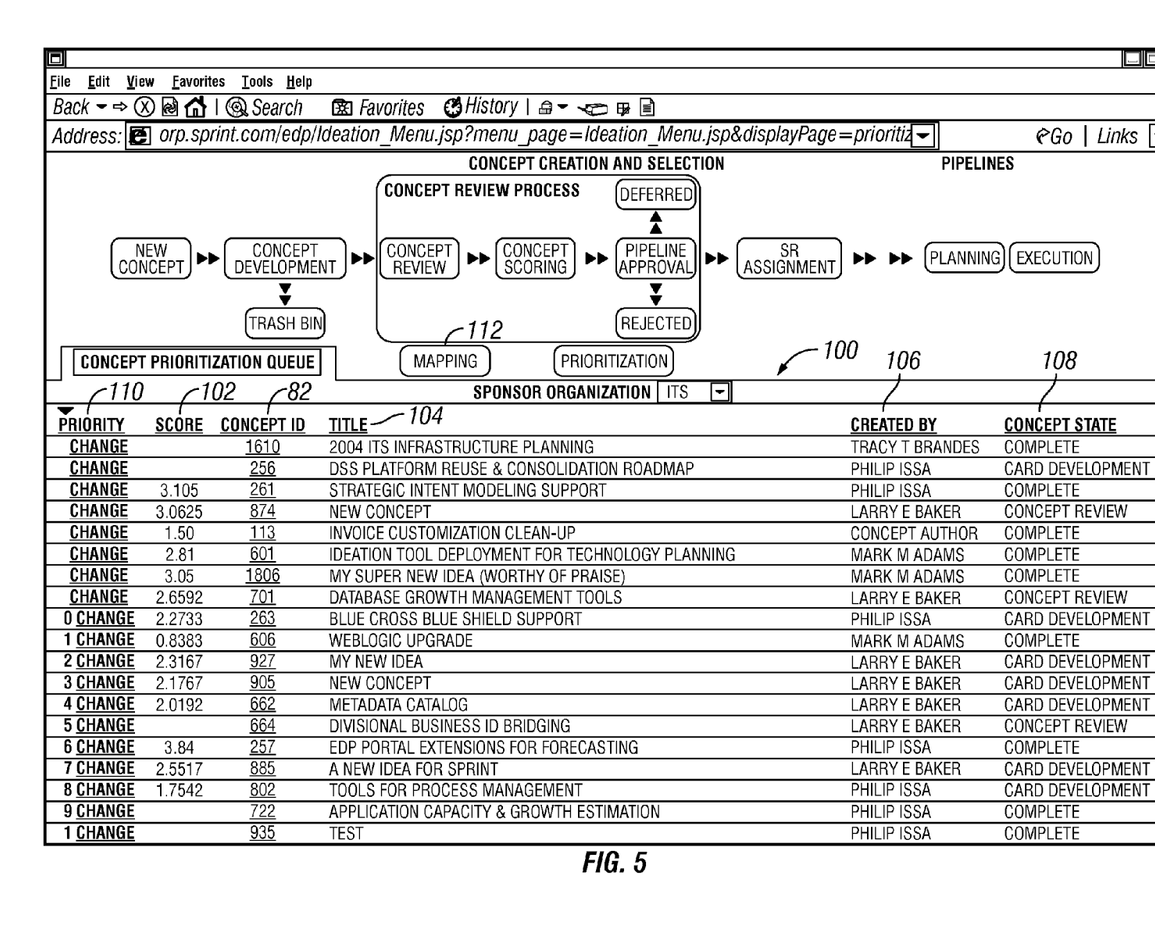
FIG. 5 illustrates a Concept Prioritization Queue graphical user interface screen.

When the Prioritization button 88 is selected the chooser component 20, which is in communication with the database 18, reads the plurality of data structures 16 from the database 18, and sends the data structures 16 to the GUI 14. The GUI 14 displays the plurality of data structures 16 in a Concept Prioritization Queue screen 100.

Turning now to FIG. 5, the Concept Prioritization Queue screen 100 is shown. The Concept Prioritization Queue screen 100 includes a plurality of rows, one row per project concept stored in the data structure 16 in the database 18. Each row contains a score value 102, the concept identification number 82, a concept title 104, a concept author name 106, a concept state 108, and a priority number 110.

Figure 6:
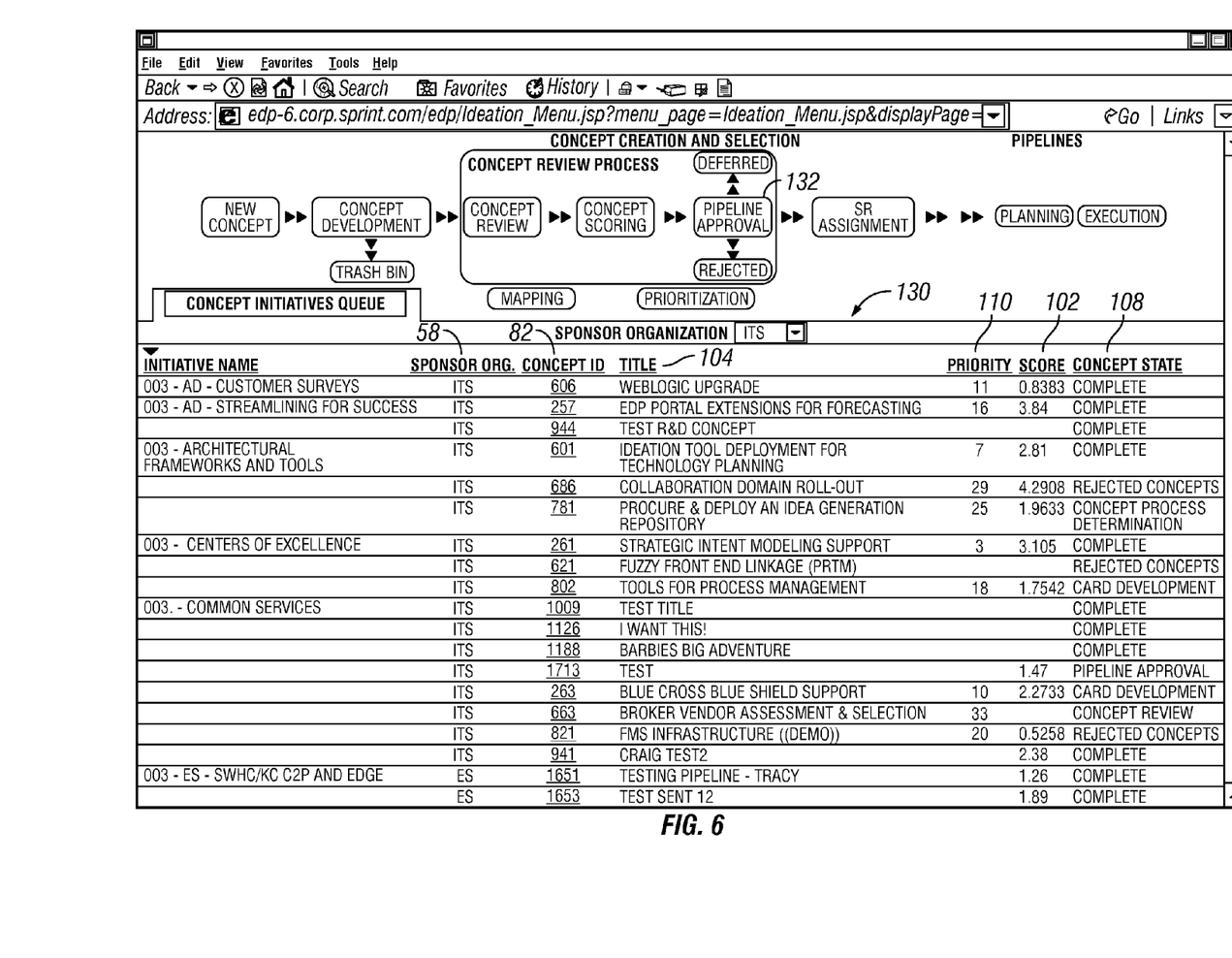
FIG. 6 illustrates a Concept Initiatives Queue graphical user interface screen.

The Concept Prioritization Queue screen 100 supports assigning a priority to the concepts and changing these priorities. The prioritization of concepts is expected to be an iterative process in which priorities are assigned, different GUI 14 views of the concept information are examined, discussion among decision makers takes place, priorities are reassigned, and the cycle repeats until the decision makers are satisfied. A Mapping button 112 selects a Concept Initiatives Queue screen 130 to display.

Turning now to FIG. 6, the Concept Initiatives Queue screen 130 is shown. The Concept Initiatives Queue screen 130 displays a plurality of rows, one row per project concept stored in the data structure 16 in the database 18, with the project concepts grouped according to strategic initiatives. Each row includes the concept identification number 82, the concept title 104, the score value 102, the concept state 108, the priority number 110, and the name of the sponsoring organization 58. By looking at the Concept Initiatives Queue screen 130, managers can quickly determine how well corporate strategic initiatives are supported by the proposed project prioritization. If the priority assigned to all projects associated with a particular strategic initiative is low, this does not comport with this strategy being a major strategic initiative of the business. Managers who are accountable for the success of this strategic initiative, for example, can argue for raising the priorities of several of the concepts aligned with their initiative on the basis that their initiative will fail due to lack of support if these other concepts are not pursued as well.

When a concept row is selected, selecting the Pipeline Approval button 132 selects the concept associated with the concept row for funding, thus completing the evaluation process. These actions are associated with the chooser component 20 writing the appropriate state value for the concept back to the data structure 16 in the database 18. If the concept is selected, in some embodiments a signal is sent to a funding system 22 indicating the project concept that has been selected and including the appropriate concept information. In other embodiments, the funding system 22 has access to the database 18 and searches for data structures 16 containing a state indicating that the project concept has been selected for funding. In the preferred embodiment of the concept selection tool 10, the final evaluation action of rejecting, deferring, or selecting a concept is a manual operation. Other considerations beyond the figure of merit and the priority of the concept come into play. For example, a concept which has a low figure of merit and a low priority may still be selected for funding because the project concept addresses some change that is not within the discretion of the enterprise, for example, a change that is legally mandated as a result of new legislation, changed regulation, or court order. In other embodiments of the concept selection tool 10, however, the final selection may be automated based on the priority of concepts.

The GUI screens depicted above—the concept creation and selection tool screen 50, the New Concept screen 54, the Edit Concept Score screen 80, the Concept Prioritization Queue screen 100, and the Concept Initiatives Queue screen 130—are all illustrative. This disclosure contemplates both additional GUI screens and modifications of the described screens.

Figure 7:
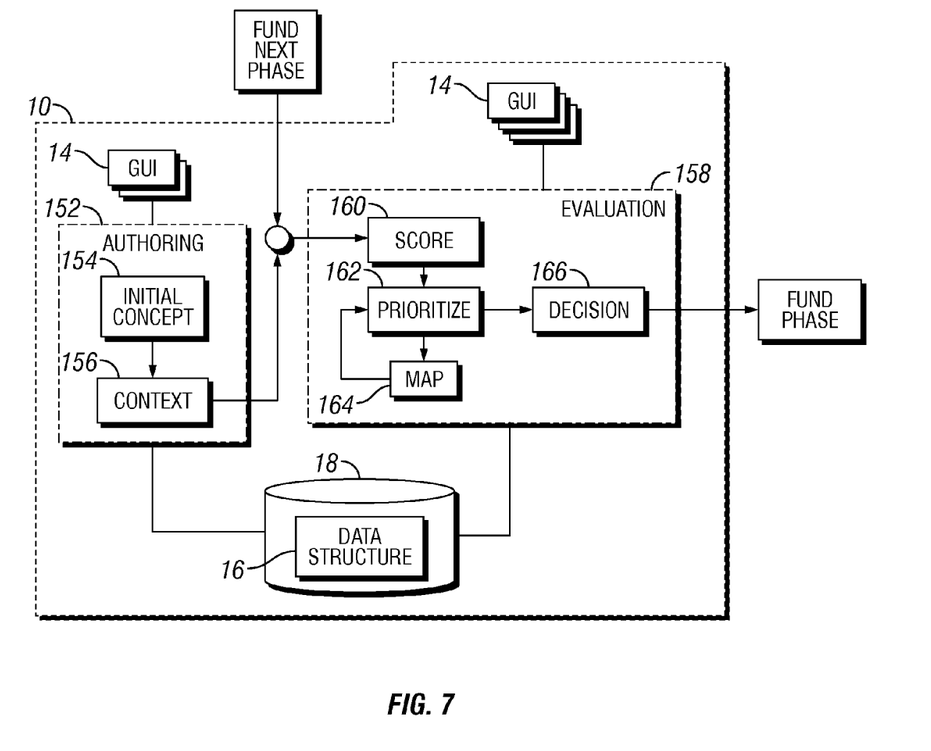
FIG. 7 is a block diagram illustrating another embodiment of the concept selection tool.

Turning now to FIG. 7, another embodiment of the concept selection tool 10 is depicted. The GUI 14 is shown as comprising several screens and may be web-based. The GUI 14 is in communication with an authoring component 152 which comprises an initial conceptualization component 154 and a business context definition component 156. The New Concept screen 54, described above with FIG. 3, is used to create the name of the concept and to brainstorm about the boundaries and goals of the concept. In some embodiments the initial conceptualization information may be visible to a broad community of individuals who may be able to comment or vote on the concept in an automated forum. The vote would not determine whether the concept is to be selected or not, but rather would provide a subjective indication of peer interest in the concept. The initial conceptualization work is captured in the data structure 16 and stored in the database 18.

After the initial concept is captured, the New Concept screen 54 is used to define the business context of the project concept. The concept business context information is captured in the data structure 16 and stored in the database 18. The context information may be incrementally supplied over multiple sessions using the New Concept screen 54. When the context has been fully defined, the Concept Review button 70 is activated. This causes the state of the data structure 16 to be updated in the database 18. The button may also cause a signal to be sent to an evaluation component 158.

The evaluation component 158 is responsible for evaluating and selecting project concepts and is in communication with the GUI 14. The evaluation component 158 is comprised of a scoring component 160, a prioritization component 162, an initiative mapping component 164, and a decision component 166. When a concept is ready for evaluation the Edit Concept Score screen 80 may be displayed. The Edit Concept Score screen 80 may be used to characterize a project concept and to calculate the score of the project concept, as discussed above for FIG. 4.

The scoring component 160 then calculates the score of the project concept or project idea based on the characterization information and stores both the characterization information and the score in the data structure 16 in the database 18. This score is intended to represent the general quality of the concept. This score is not a metric, and it does not measure the performance or operational efficiency of a project concept, as the project has not been executed and put into operation. The application of the same calculation algorithm to project concepts or project ideas which are evaluated in the same time frame provides an objective element to the evaluation process.

The score may be useful in breaking ties between otherwise equally important project concepts. The score may be useful to representatives from different business units trying to merge their separate concept prioritizations into a single enterprise concept prioritization. The score may be useful for getting a sense of what direction to go in with a large set of project concepts and to help focus on the project concepts which will be most productive for the enterprise. It may not be the primary support of the concept selection decision making process.

The calculation algorithm may change over time, such as when enterprise strategic initiatives shift, for example, where financial expectations change and the enterprise is inclined to accept greater risk in exchange for greater expected return on investment. The algorithm is captured in the database 18, and when the algorithm is changed, database 18 triggers automatically recalculate all the scores stored in the data structures 16 contained within the database 18.

The evaluation of concepts may be conducted, for example, by a team of managers who convene once a week, biweekly, or on some other periodic basis to evaluate project concepts or project ideas using the concept evaluation tool 10. Selecting the Prioritization button 88 causes the Concept Prioritization Queue screen 100 to display. The Concept Prioritization Queue screen 100 may be used, as described above for FIG. 5, to prioritize project concepts. The Concept Prioritization Queue screen 100 permits assignment and reassignment of priorities to concepts. The Concept Prioritization Queue screen 100 supports displaying concept rows ordered according to priority or ordered according to score, and permits convenient switching between ordering choices.

The Mapping button 112 causes the Concept Initiative Queue screen 130 to display as described above for FIG. 6. This view of the concepts lets a manager responsible for championing a strategic initiative see how the project concepts which support his or her strategic initiative are getting along in the priority setting part of evaluation. If none of the project concepts supporting a strategic initiative is given a substantial priority, a manager responsible for championing a strategic initiative can argue that some priorities on these project concepts need to be raised; otherwise the strategic initiative will starve for lack of funding support. The Concept Initiatives Queue screen 130 links enterprise strategy initiatives with the project concept selection process.

The GUI 14 permits convenient switching between the Concept Prioritization Queue screen 100 and the Concept Initiatives Queue screen 130. It is expected that the evaluation process, which revolves around prioritizing the project concepts or project ideas, will be an iterative process of discussion, reassigning priorities, and viewing concepts grouped according to initiative in the Concept Initiatives Queue screen 130. When the evaluator or evaluators are satisfied, a concept row may be selected and a decision button may be activated, causing a GUI 14 evaluation decision screen to display which supports rejecting the concept, selecting the concept for funding, or deferring the concept until a later time. Whatever choice is made is reflected in a state value which the decision component 166 writes into the data structure 16 in the database 18. In some cases project concepts which have a low priority and have a low score may be selected for funding, as for example if the project concept is legally mandated and the enterprise is obligated to develop the project concept.

In the preferred embodiment the project concept passes through several funding cycles before the project concept is fully implemented. A first decision needs to be made whether the project concept or project idea merits allocating funds to conduct a feasibility analysis and to draft a preliminary level-of-effort bid. This phase may be termed the definition phase. After determining that a project concept is feasible and estimating a coarse level-of-effort bid, a second decision needs to be made whether the project concept merits allocating more funds to perform requirements analysis and to develop a high level design. This phase may be termed the planning or discovery phase. After developing the project plans, a third decision needs to be made whether to fund implementation and deployment of the project concept. Each decision point may be referred to as a gate or a decision gate.

At each funding stage the evaluation phase is repeated and the project concept may be rejected, deferred until later, or selected for funding. Each time a project concept reenters the evaluation phase it repeats the evaluation steps beginning with scoring by the scoring component 160. As time passes, the enterprise strategic initiatives change and their relative importance shifts, which leads the score calculation algorithm to be changed accordingly. In some embodiments, different evaluation phases may be associated with different characterization information being requested. For example, coarse level-of-effort estimates become available after the first decision and before the second decision. It may be useful if this coarse level-of-effort estimate was used to calculate the score of the concept. In other cases, of course, this information may not form part of the score calculation but may be considered subjectively when prioritizing several project concepts or project ideas.

In some organizations the concept selection tool 10 may be employed by lower level managers conducting triage and filtering of a large number of project concepts. This panel of managers may consolidate related ideas and abandon or defer other ideas before rolling up a substantially smaller number of project concepts for the consideration of the executives making project concept selection and funding decisions. These executives may use the concept selection tool 10 also. The concept selection tool 10 may also be used as an analysis tool, to understand how a strategic initiative is supported by actual projects and to identify in what stage those projects are.

Figure 8:
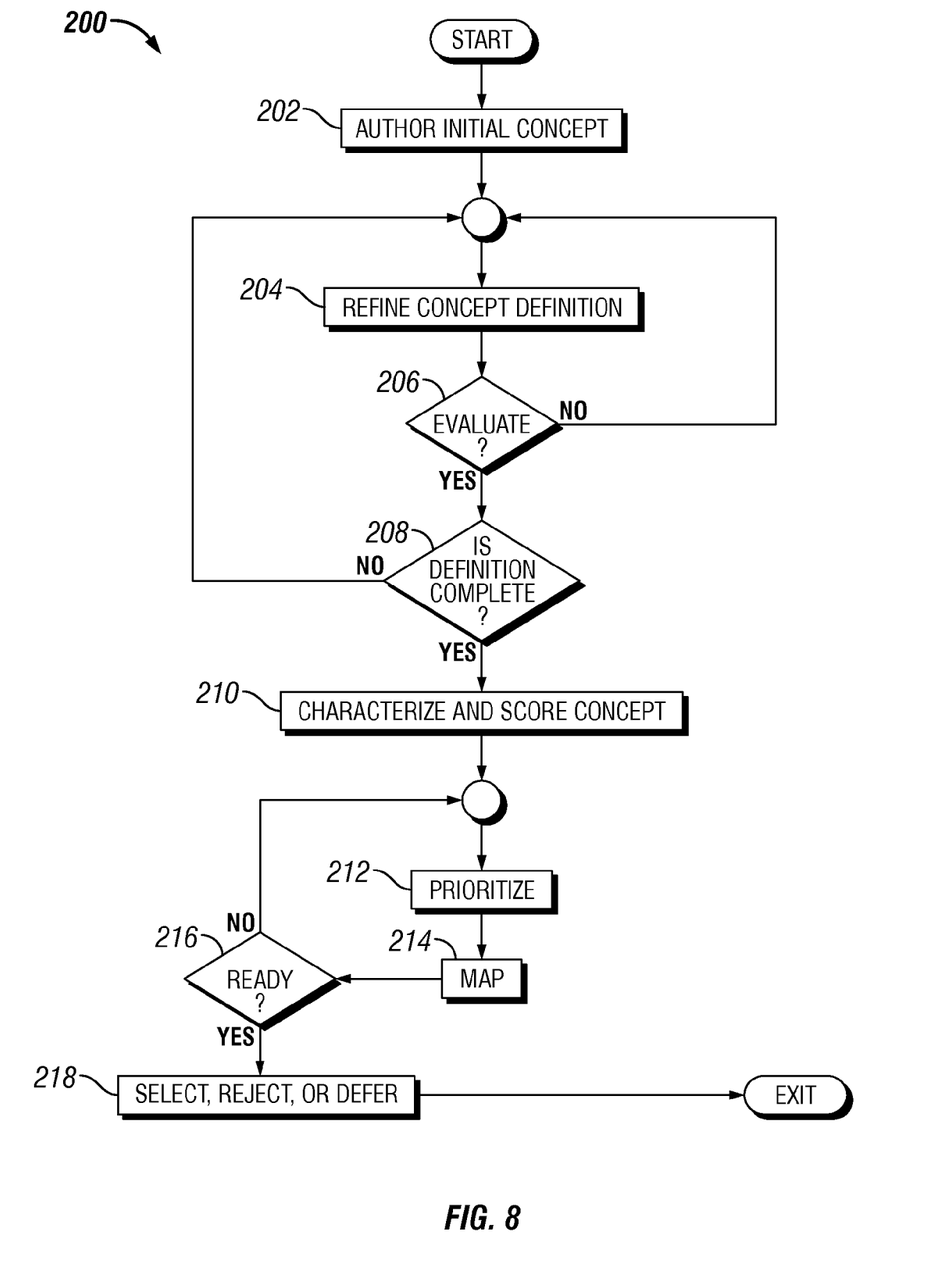
FIG. 8 is a flow-chart describing a method for using the concept selection tool according to one embodiment.

Turning now to FIG. 8, a method 200 for using the concept selection tool 10 is depicted. The method begins at block 202 where the initial project concept or project idea is drafted. At a block 204, the concept is refined by adding further details. At block 206, if the concept is not fully defined, the method proceeds back to block 204 to be further refined. If the concept is sufficiently defined and hence ready to be evaluated, the method proceeds to block 208.

In block 208, the concept definition is examined by a reviewer for completeness. In some embodiments, the reviewer may receive email notices when a concept is judged ready for evaluation. In other embodiments, the reviewer may periodically check status of all projects using the concept selection tool 10. If the reviewer judges the concept definition to be incomplete according to the evaluation standards of the enterprise, the method returns to block 204 where the concept is refined by adding further details. If the concept definition is complete, the method proceeds to block 210. The reviewer may provide comments to the author of the concept pointing out incomplete information which must be supplied or identifying weaknesses of the concept which must be remedied before the concept will be accepted for evaluation.

At block 210, the concept is characterized by identifying the strategic initiative with which the concept is aligned, identifying the sponsoring organization, identifying the implementing organization, identifying the time sensitivity level of the concept, identifying a technology category and an innovation level of the concept. In some embodiments, different characterization information is required depending upon what organization within the enterprise is evaluating the project concept or project idea or upon what organization is originating the concept. When the characterization information has been provided, the concept is scored employing a calculation algorithm. The calculation algorithm may change over time, as when enterprise strategies shift.

The method proceeds to block 212 where the concept is prioritized. Prioritization involves examining the information available about the project concept or project idea and ranking the concept relative to other competing concepts. The prioritization takes into consideration the score calculated in block 210, any external mandates for implementing the concept, and other factors.

The method proceeds to block 214 where the concept is mapped to the strategic initiative with which it is most closely aligned. The priorities of the plurality of competing concepts are examined in the light of the strategic initiatives and how they are supported by the prioritization of the concepts.

At block 216, if the prioritization of concepts does not provide the needed support for strategic initiatives, the method proceeds to block 212 where the concepts are reprioritized. If the prioritization of concepts supports the strategic initiatives sufficiently, the method proceeds to block 218 where decisions are made to either reject, defer, or select each project. The method then exits.

The concept selection tool 10 provides a system for objectively evaluating projects using a score or figure or merit. The concept selection tool 10 operable to link the concepts, ideas, or projects to the enterprise strategic initiatives and/or projects. The GUI 14 mapping view, for example, provides an independent utility for mapping projects to the strategic initiatives.

Figure 9:
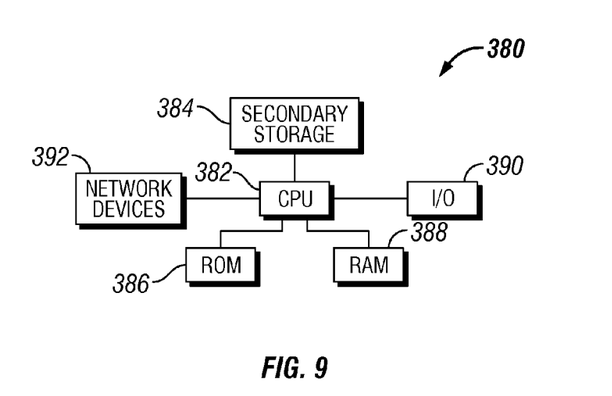
FIG. 9 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A system for selecting a concept, comprising:
   a database to store information about an enterprise development concept to be funded;
   a memory component configured to store instructions defining a graphical user interface;
   a processor configured to execute instructions to implement at least one graphical user interface, the graphical interface comprising:
   an authoring component displayed on the graphical interface that enables a user to provide the information about the enterprise development concept to be funded, the information about the enterprise development concept including a concept definition that defines a plurality of attributes of the enterprise development concept, wherein the plurality of attributes include a strategic enterprise initiative with which the enterprise development concept is aligned, the authoring component in communication with the database;
   a scoring component displayed on the graphical interface that enables at least one scoring individual to score the enterprise development concept to be funded, wherein the score is calculated based on the plurality of attributes of the enterprise development concept, wherein the score is a measure of the quality of the concept and is not a measure of the performance or operational efficiency of the concept, and wherein the score of the concept by the at least one scoring individual is maintained by the database as part of the information about the enterprise development concept;
   a concept prioritization component displayed on the graphical user interface that enables a priority to be assigned to the enterprise development concept, wherein the concept prioritization component is configured to create a priority list of a plurality of enterprise development concepts with a corresponding score and assigned priority associated with each of the plurality of enterprise development concepts in the priority list, and wherein the enterprise development concept and the score of the enterprise development concept calculated by the scoring component are ordered in the priority list based upon the assigned priority;

an initiative mapping component displayed on the graphical interface, wherein responsive to receiving a selection of the initiative mapping component, the initiative mapping component displays a concept initiative screen that includes a plurality of enterprise development concepts, each of the plurality of enterprise development concepts in the concept initiative screen is displayed with a corresponding score and priority, wherein the plurality of enterprise development concepts include the enterprise development concept to be funded displayed with the score of the enterprise development concept calculated by the scoring component and the assigned priority of the enterprise development concept, wherein the initiative mapping component groups the enterprise development concept with other enterprise development concepts of the plurality of enterprise development concepts in the concept initiative screen based on the strategic enterprise initiative with which the enterprise development concept is aligned; and an evaluation component displayed on the graphical interface which allows one or more evaluators to consider and designate a course of action, wherein the evaluators are enabled to analyze the enterprise development concept and use the concept initiative screen, the score of the enterprise development concept and the priority list to designate the course of action.

2. The system of claim 1, wherein the course of action is to further consider the concept.

3. The system of claim 1, wherein the course of action is to terminate consideration of the concept.

4. The system of claim 1, wherein the course of action is selected from a group comprising of suspended consideration of the concept for a specified period, rework the concept, and reschedule a subsequent review of the concept.

5. The system of claim 1, wherein the at least one scoring individual is different from the one or more evaluators.

6. The system of claim 1, wherein the scoring individuals are the same individuals as the one or more evaluators.

7. The system of claim 1, wherein the score of the concept does not define the evaluation of the concept.

8. The system of claim 1, wherein the evaluation is independent of the score of the concept.

9. The system of claim 1 wherein the information about the concept includes the concept definition, a concept state, and a concept characterization, wherein the concept characterization includes a characterization of the plurality of attributes of the enterprise development concept.

10. The system of claim 9 wherein the concept definition further includes at least one of a plurality of attributes selected from the group consisting of a concept name, a sponsoring organization name, a concept identification number, and a sponsoring manager.

11. The system of claim 9 wherein the concept characterization includes a plurality of attributes selected from the group comprising a strategy type, a time sensitivity level, and an innovation level.

12. The system of claim 1 further comprising an enterprise development process system that maintains the strategic enterprise initiative, wherein the database associates the strategic enterprise initiative with the enterprise development concept.

13. The system of claim 1 wherein the authoring component is further defined to include an initial concept authoring component and an authoring iteration component.

14. The system of claim 1 wherein the scoring component receives a characterization of the plurality of attributes and calculates the score based on the characterization, and is configured to communicate the score to the database which stores the score with the information about the concept.

15. The system of claim 14 wherein the characterization is in the form of a score matrix having the plurality of attributes and wherein the selection of attributes is based on a business unit.

16. The system of claim 15 wherein one of the attributes identifies the enterprise strategic initiative with which the enterprise development concept is aligned.

17. The system of claim 14 wherein the information about the enterprise development concept further includes the priority assigned to the enterprise development concept and wherein the system further comprises a graphical user interface displays information about concepts in a priority order based on the priority of the concepts and in a score order based on the score of the concepts.

18. A system for a selection of projects for an enterprise development, the system comprising:

a memory component configured to store instructions defining an enterprise development process, the enterprise development process including strategic enterprise initiatives;

a processor configured to the execute instructions to implement the enterprise development process and generate an output, the enterprise development process comprising:

a definition component configured to define a development project, wherein the definition of the development project defines a plurality of attributes of the enterprise development project, wherein the plurality of attributes include at least one of the strategic enterprise initiatives with which the development project is aligned;

a scoring component configured to calculate a quality level of the development project using an algorithm which changes upon changes to the strategic initiatives, wherein the quality level is calculated based on the plurality of attributes of the development project;

a prioritization component configured to assign priority to the development project, wherein the prioritization component is further configured to create a priority list graphical user interface of a plurality of development projects with a corresponding quality level and priority associated with each of the plurality of development projects, and wherein the prioritization component is configured to create the priority list with the development project and the quality level of the development project ordered in the priority list according to the priority assigned to the development project;

an initiative mapping component that is configured responsive to selection to display an initiative screen that includes a plurality of rows with one of the plurality of development projects per row, wherein each row comprises a corresponding development project identification, development project quality level, and development project priority, wherein the plurality of rows include a row for the development project with the quality level of the development project and the assigned priority of the development project, and wherein the initiative mapping component groups the row for the development project with other rows of the plurality of rows based on the at least one of the strategic enterprise initiatives with which the development project is aligned;

a selection component configured to defer one or more of the plurality of development projects and further to select one or more of the plurality of development projects for funding, wherein the selection of one or more of the plurality of development projects for funding is based on the quality level and the priority of the plurality of development projects; and a final evaluation component to manually approve the one or more of the plurality of development projects selected by the selection component.

19. The system of claim 18 wherein the prioritization component is further configured to create the priority list with the development project and the priority of the development project ordered in the priority list according to the quality level calculated for the development project.

20. A method for project selection, comprising:

generating a list of enterprise development projects to be funded using input from an input graphical user interface, the input from the input graphical user interface defines a plurality of attributes of each of the enterprise development projects to be funded, wherein one of the plurality of attributes links each of the enterprise development projects with a corresponding one of a plurality of enterprise strategic initiatives with which the enterprise development project is aligned;

maintaining the enterprise development projects to be funded in a database;

assigning a priority to each of the enterprise development projects to be funded;

displaying the enterprise development projects to be funded in a priority graphical user interface with the enterprise development projects ordered according to the priorities assigned to the enterprise development projects;

scoring the enterprise development projects to be funded to calculate a quality of each of the enterprise development projects to be funded, wherein the quality of each of the enterprise development projects to be funded are scored based on a the plurality of attributes of each of the enterprise development projects using an algorithm, wherein the algorithm changes in response to changes to the enterprise strategic initiatives, and the algorithm is stored in the database;

displaying the enterprise development projects to be funded in a quality graphical user interface with the enterprise development projects ordered according to the quality level calculated for each of the enterprise development projects, grouping, by a mapping component, the enterprise development projects to be funded according to the strategic initiatives associated with the enterprise development projects to be funded;

displaying, by the mapping component, the enterprise development projects to be funded in a mapping graphical user interface with each of the enterprise development projects being displayed with the quality and the priority of the enterprise development projects, and wherein the mapping component displays the enterprise development projects to be funded in groups according to the corresponding strategic initiatives linked with the enterprise development projects to be funded;

verifying that the enterprise development projects to be funded are consistent with considerations other than the scoring of the enterprise development projects, wherein the considerations other than the scoring include a change mandated by one or more of a new legislation, a changed regulation, or a court order; and selecting to fund one or more of the enterprise development projects to be funded based upon an analysis of one or more of the priority graphical user interface, the quality graphical user interface, and the mapping graphical user interface.

21. The method of claim 20 wherein scoring the projects further includes:

receiving a characterization of the plurality of attributes of each of the enterprise development projects; and calculating the score based on the characterization.

22. The method of claim 21 wherein the plurality of attributes further include one or more attributes selected from the group consisting of a development organization name, a time sensitivity level, a technology category, and an innovation level.

23. The method of claim 20 further comprising funding the selected one or more of the enterprise development projects.

24. The method of claim 20 wherein the plurality of attributes further include a name of the enterprise development project, sponsoring organization, and a sponsoring manager.

25. The system of claim 18 wherein the plurality of attributes further include one or more attributes selected from the group consisting of a developing organization name, a sponsoring organization name, a time sensitivity level, and an innovation level.

* * * * *